US012781705B2

(12) United States Patent
Sørensen et al.

(10) Patent No.: US 12,781,705 B2
(45) Date of Patent: Nov. 3, 2026

(54) METHOD FOR REDUCING BLADE VIBRATIONS IN A WIND TURBINE

(71) Applicant: VESTAS WIND SYSTEMS A/S, Aarhus N (DK)

(72) Inventors: Kim Hylling Sørensen, Aarhus C (DK); Torben Juul Larsen, Roskilde (DK); Thomas S. Bjertrup Nielsen, Randers SV (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 345 days.

(21) Appl. No.: 18/707,691

(22) PCT Filed: Nov. 3, 2022

(86) PCT No.: PCT/DK2022/050230
§ 371 (c)(1),
(2) Date: May 6, 2024

(87) PCT Pub. No.: WO2023/078519
PCT Pub. Date: May 11, 2023

(65) Prior Publication Data

US 2026/0258782 A1 Sep. 3, 2026

(30) Foreign Application Priority Data

Nov. 4, 2021 (DK) ............................. PA202170540

(51) Int. Cl.
*F03D 7/02* (2006.01)

(52) U.S. Cl.
CPC ......... *F03D 7/0296* (2013.01); *F03D 7/0224* (2013.01); *F05B 2260/96* (2013.01)

(58) Field of Classification Search
CPC ... F03D 7/0296; F03D 7/0224; F05B 2260/96
See application file for complete search history.

(56) References Cited

U.S. PATENT DOCUMENTS

2009/0169379 A1 7/2009 McClintic
2009/0208337 A1* 8/2009 Chambers ............... F03D 3/062 416/210 R
2012/0051914 A1 3/2012 Dehlsen et al.

FOREIGN PATENT DOCUMENTS

CN 101413477 A 4/2009
CN 102536683 A 7/2012
(Continued)

OTHER PUBLICATIONS

Danish Patent and Trademark Office, 1st Technical Examination including The Search Report for Application PA 2021 70540 dated Apr. 26, 2022.

(Continued)

*Primary Examiner* — Viet P Nguyen
(74) *Attorney, Agent, or Firm* — Patterson + Sheridan, LLP; Gero G. McClellan

(57) ABSTRACT

A method for controlling a wind turbine is disclosed. The wind turbine comprises three or more wind turbine blades, and blade connecting wires, each blade connecting wire extending between a connection point on one wind turbine blade and a connection point on a neighbouring wind turbine blade. The wind turbine further comprises pre-tension wires, each pre-tension wire being connected to one of the blade connecting wires and to a pre-tension adjustment mechanism. The method comprises measuring at least one parameter of the wind turbine blades of the wind turbine, and deriving, from the at least one measured parameter, an estimate for blade vibrations within the rotor plane of each wind turbine blade and/or coupled rotor vibrations originating from the wind turbine blades. The pre-tension adjustment mechanism is controlled based on the estimated vibrations in order to counteract the blade vibrations and/or coupled rotor vibrations.

15 Claims, 5 Drawing Sheets

(56) References Cited

FOREIGN PATENT DOCUMENTS

| | | | |
|---|---|---|---|
| CN | 103867390 | A | 6/2014 |
| CN | 106089573 | A | 11/2016 |
| CN | 106917719 | A | 7/2017 |
| EP | 2112372 | A1 | 10/2009 |
| GB | 2485595 | A | 5/2012 |

OTHER PUBLICATIONS

PCT International Search Report and Written Opinion of The International Searching Authority for Application PCT/DK2022/050230 dated Feb. 13, 2023 (Feb. 13, 2023).
Office Action received for European Patent Application No. 22805769.1, mailed on Apr. 1, 2025, 5 pages.
Intention to grant received for European Patent Application No. 22805769.1, mailed on Dec. 18, 2025, 6 pages.

* cited by examiner

METHOD FOR REDUCING BLADE VIBRATIONS IN A WIND TURBINE

FIELD OF THE INVENTION

The present invention relates to a method for controlling a wind turbine being provided with pre-tensioned blade connecting wires interconnecting the wind turbine blades in order to allow the wind turbine blades to mutually support each other. In the method according to the invention, the pre-tension applied to the blade connecting wires is adjusted in order to counteract blade vibrations and/or coupled rotor vibrations of the wind turbine.

BACKGROUND OF THE INVENTION

During operation of a wind turbine, as well as during standstill, the components of the wind turbine are subjected to various loads. For instance, the wind turbine blades of the wind turbine are subjected to loads originating from gravity acting on the wind turbine blades, loads originating from wind pressure on the wind turbine blades, loads originating from changes in wind direction, turbulence, etc.

As the size of wind turbine blades increases, the loads on the wind turbine also increase. In order to handle such increased loads, the amount of material used for manufacturing the wind turbine may be increased. However, this increases the weight as well as the manufacturing costs of the wind turbine.

As an alternative to increasing the amount of material used for the wind turbine, in particular for the wind turbine blades, the wind turbine may be provided with blade connecting wires, i.e. wires which interconnect the wind turbine blades. Such blade connecting wires cause the wind turbine blades to mutually support each other, in the sense that loads on the wind turbine blades are 'shared' among the wind turbine blades, via the blade connecting wires. The blade connecting wires may be pre-tensioned.

In wind turbines, the wind turbine blades may be subjected to blade vibrations, in particular during operation of the wind turbine. Such blade vibrations may be very harmful to the wind turbine, since they may cause extreme loads as well as fatigue loads on the wind turbine. It is therefore desirable to prevent or counteract such vibrations. However, in particular vibrations in an edgewise direction and/or within the rotor plane are difficult to mitigate with known measures, such as pitch control.

CN 102536683 B discloses a zonal cable device for enhancing stability of blades of large wind turbines. The zonal cable device comprises a zonal cable system and a cable tension adjusting system. The cable tension adjusting system comprises an automatic controller connected with a zonal tension screw adjuster via a control line. Relaxed tension occurs during the operation of the wind turbine. In this case, after the relaxed tension is sensed by the tension sensor, the zonal tension screw adjuster is rotated on a front tension bearing shaft to adjust the tension of the zonal cable system, in order to allow for the tension of the blade on the rotating surface to reach a reasonable set value. All adjustment processes can be controlled and automatically completed by the automatic controller mounted in the wind turbine hub.

DESCRIPTION OF THE INVENTION

It is an object of embodiments of the invention to provide a method for controlling a wind turbine in which blade vibrations, in particular edgewise blade vibrations, are handled in an easy and cost effective manner.

It is a further object of embodiments of the invention to provide a method for controlling a wind turbine in which coupled rotor vibration, in particular coupled rotor vibrations within the rotor plane, are handled in an easy and cost effective manner.

The invention provides a method for controlling a wind turbine, the wind turbine comprising a tower, a nacelle mounted on the tower, a hub mounted rotatably on the nacelle, and three or more wind turbine blades, each wind turbine blade extending between a root end connected to the hub via a pitch mechanism, and a tip end, the wind turbine blades defining a rotor plane, the wind turbine further comprising blade connecting wires, each blade connecting wire extending between a connection point on one wind turbine blade and a connection point on a neighbouring wind turbine blade, and pre-tension wires, each pre-tension wire being connected to one of the blade connecting wires and to a pre-tension adjustment mechanism, the method comprising the steps of:

- measuring at least one parameter of the wind turbine blades of the wind turbine,
- deriving, from the at least one measured parameter, an estimate for blade vibrations within the rotor plane of each wind turbine blade and/or coupled rotor vibrations originating from the wind turbine blades, and
- controlling the pre-tension adjustment mechanism based on the estimated vibrations in order to counteract the blade vibrations and/or coupled rotor vibrations.

Thus, the method according to the invention is a method for controlling a wind turbine. The wind turbine is a pitch controlled wind turbine, i.e. a wind turbine which comprises wind turbine blades which are able to rotate about a substantially longitudinal pitch axis, in order to adjust an angle of attack between the wind turbine blades and the incoming wind, during operation of the wind turbine.

The wind turbine comprises a tower and a nacelle mounted on the tower. The wind turbine further comprises a hub mounted rotatably on the nacelle and three or more wind turbine blades. Each wind turbine blade extends between a root end which is connected to the hub via a pitch mechanism, and a tip end. Thus, the wind turbine blades rotate along with the hub, relative to the nacelle, and the tip ends of the wind turbine blades point away from the hub. Since the wind turbine blades are connected to the hub via pitch mechanisms, each wind turbine blade is able to rotate relative to the hub, i.e. to perform pitching movements. The hub and the wind turbine blades form a rotor of the wind turbine, and the wind turbine blades define a rotor plane.

The nacelle is normally mounted on the tower via a yaw system allowing the nacelle to rotate relative to the tower in order to appropriately orient the rotor in accordance with the direction of the wind.

The wind turbine further comprises blade connecting wires. Each blade connecting wire extends between a connection point on one wind turbine blade and a connection point on a neighbouring wind turbine blade. Accordingly, each blade connecting wire interconnects two neighbouring wind turbine blades.

The wind turbine further comprises pre-tension wires. Each pre-tension wire is connected to one of the blade connecting wires and to a pre-tension adjustment mechanism. Accordingly, the pre-tension wires pull the blade connecting wires towards the pre-tension adjustment mechanism, and thereby the pre-tension wires provide pre-tension to the blade connecting wires. Furthermore, the pre-tension provided to the blade connecting wires by the pre-tension wires can be adjusted by appropriately operating or manipulating the pre-tension adjustment mechanism.

The pre-tension adjustment mechanism may be arranged in the hub, at the hub or near the hub. As an alternative, the pre-tension adjustment mechanism may be arranged in the blade root of one or more of the wind turbine blades, or in a part of the wind turbine blades between the root end and the connection point.

In the present context the term 'wire' should be interpreted broadly to cover any suitable kind of tension element, such as metal wires or ropes, fibre ropes, composite pultrusion, metal rods, etc.

The blade connecting wires may have a stiffness which differs from the stiffness of the pre-tension wires, or the stiffness of the blade connecting wires and the pre-tension wires may be identical.

The pre-tension wires may, e.g., be connected to the blade connecting wires at a position which is distanced from each of the connecting points on the wind turbine blades, e.g. with substantially equal distance to the connecting points, i.e. approximately halfway between the wind turbine blades along the blade connecting wire.

The pre-tensioned blade connecting wires cause the wind turbine blades to mutually support each other, in the sense that loads on the wind turbine blades, in particular edgewise loads and flapwise loads, are 'shared' among the wind turbine blades, via the pre-tensioned blade connecting wires. Thereby the loads on the wind turbine blades, during operation as well as during standstill, can be handled without requiring higher material thickness, and thereby increased weight and higher manufacturing costs.

The wind turbine may be an upwind wind turbine. In this case the rotor of the wind turbine faces the incoming wind, and thereby the flapwise loads on the wind turbine blade, originating from the wind, push the wind turbine blades towards the hub and the tower.

As an alternative, the wind turbine may be a downwind wind turbine. In this case the rotor of the wind turbine is directed opposite to the incoming wind, and thereby the flapwise loads on the wind turbine blades, originating from the wind, push the wind turbine blades away from the hub and the tower.

In the method according to the invention, at least one parameter of the wind turbine blades of the wind turbine is initially measured. The measured parameter(s) may relate to loads, strains, vibrations, movements, accelerations, etc. of the wind turbine blades. The parameter may be measured directly on the wind turbine blades. As an alternative, an indirect measurement of the parameter may be obtained by performing measurements on other parts of the wind turbine, e.g. the hub or the nacelle, and deriving the parameter relating to the wind turbine blades therefrom. For instance, a measure for blade vibrations may be derived from a measurement of a strain level in the hub. In any event, the measured parameter(s) relate to the wind turbine blades, and thereby reflect(s) conditions experienced by the wind turbine blades, and thereby by the rotor.

Next, an estimate for blade vibrations within the rotor plane of each wind turbine blade and/or coupled rotor vibrations originating from the wind turbine blades is derived from the at least one measured parameter.

In the present context the term 'blade vibrations within the rotor plane' should be interpreted to mean vibrations of the wind turbine blades which take place within the rotor plane defined by the wind turbine blades. It is not ruled out that the wind turbine blades vibrate along a direction which is not completely arranged in the rotor plane, i.e. the vibrations of the wind turbine blades may take place along a direction which has a component which is out-of-plane with respect to the rotor plane. In this case the blade vibrations being estimated correspond to the component of the blade vibrations which is arranged in the rotor plane. During normal operations, blade vibrations within the rotor plane are typically essentially edgewise vibrations. However, during idling or standstill, where the pitch angle is often close to 90°, edgewise vibrations will normally be out-of-plane with respect to the rotor plane.

In the present context the term 'coupled rotor vibrations originating from the wind turbine blades' should be interpreted to mean blade vibrations where the motion of two or more wind turbine blades interact with each other and/or the supporting structure, e.g. in the form of the hub, the blade connecting wires, the pre-tension wires, etc.

In any event, the estimated vibrations reflect actual vibrations of the wind turbine blades and/or the rotor, within the rotor plane, since the estimate is derived from the measured parameters which reflect the actual vibrations experienced by the wind turbine blades. As described above, such vibrations may be difficult to mitigate by means of known measures, such as pitch control.

Finally, the pre-tension adjustment mechanism is controlled based on the estimated vibrations in order to counteract the blade vibrations and/or coupled rotor vibrations.

By controlling the pre-tension adjustment mechanism, the pre-tension applied by the pre-tension wires to the blade connecting wires is adjusted. Thereby the mutual support among the wind turbine blades is also adjusted. More specifically, each pre-tension wire determines the pre-tension applied to the blade connecting wire which it is connected to, and thereby the mutual support among the two wind turbine blades which are interconnected by that blade connecting wire. Since the blade connecting wires interconnect the wind turbine blades essentially within the rotor plane, the mutual support among the wind turbine blades by the pre-tensioned blade connecting wires is very suitable for handling loads, vibrations, etc. within the rotor plane, notably edgewise loads, vibrations, etc. of the wind turbine blades.

Thus, in the case that the estimated vibrations are such that there may be a risk of undesired extreme loads and/or fatigue loads, the pre-tension wires may be adjusted in such a manner that the vibrations are handled or counteracted, e.g. by increasing the mutual support of the wind turbine blades, or in order to introduce vibrations which counteract or cancel out the estimated vibrations.

Handling blade vibrations within the rotor plane and/or coupled rotor vibrations originating from the wind turbine blades by appropriately controlling the pre-tension adjustment mechanism, thereby adjusting the pre-tension applied to the blade connecting wires by the pre-tension wires, based on actual measurements of parameters reflecting vibrations experienced by the wind turbine blades, is an easy and cost effective way of handling such vibrations. Furthermore, the vibrations can be handled fast and accurately. Finally, this provides a tool for handling blade vibrations within the rotor plane, which are difficult to mitigate by means of known measures, such as pitch control.

The step of deriving an estimate for blade vibrations and/or coupled rotor vibrations may comprise deriving a frequency of the vibrations, and the step of controlling the pre-tension adjustment mechanism may comprise adjusting the pre-tension provided by the pre-tension wires at a frequency which matches the frequency of the vibrations.

According to this embodiment, a frequency of the vibrations is derived, e.g. by measuring a bending moment in a flapwise and/or an edgewise direction, and subsequently isolate the vibration frequency by use of band-pass signal filtering. As an alternative, a vibration through the pre-tension wires may be measured, e.g. in an indirect manner through the force/pressure in the pre-tension wire or the pre-tension adjustment mechanism.

Once the frequency of the vibrations has been derived, the pre-tension adjustment mechanism is controlled in such a manner that pre-tension provided by the pre-tension wires varies cyclically with a frequency which matches the frequency of the vibrations, and which is in antiphase with the estimated vibrations. Thereby the cyclic variations in the pre-tension provided by the pre-tension wires precisely counteract the cyclic variations of the vibrations, and thereby the vibrations are efficiently counteracted.

The step of measuring at least one parameter of the wind turbine blades of the wind turbine may comprise measuring an edge moment of each wind turbine blade.

In the present context the term ‘edge moment’ should be interpreted to mean a moment measured at the wind turbine blade in an edgewise direction, i.e. in a direction which substantially extends between a leading edge and a trailing edge of the wind turbine blade. This direction will often be completely or nearly accommodated in the rotor plane of the wind turbine. Accordingly, the edge moment of the wind turbine blade is a suitable parameter for estimating blade vibrations within the rotor plane.

Edgewise loads on the wind turbine blades can be very damaging, and they may be difficult to handle by known methods. It is therefore an advantage of this embodiment of the invention that blade or rotor vibrations related to edgewise loads or moments of the wind turbine blade can be handled by appropriately adjusting the pre-tension adjustment mechanism.

The edgewise moment may, e.g., be an edge root moment, i.e. an edge moment measured at or near the root of the wind turbine blade. As an alternative, the edge moment may be measured in another part of the wind turbine blade, e.g. in a part of the blade which is arranged between the root end and the connection point, for instance within an inner 20% of the blade length or radius. As described above, the edge moment may be measured directly or obtained in an indirect manner.

The edge moments of the wind turbine blades may, e.g., be measured by measuring strain at the wind turbine blades, using a suitable strain sensor, such as one or more strain gauges or one or more optical fibres.

As an alternative, the step of measuring at least one parameter of the wind turbine blades of the wind turbine may comprise measuring a tension of each of the pre-tension wires. The tension in the pre-tension wires may be measured directly or indirectly, e.g. by measuring a hydraulic pressure or piston stroke. The tension of a given pre-tension wire is an indication of how much or to which extent the pre-tension wire is pulling the blade connecting wire it is connected to, and thereby it provides a measure for the pre-tension which the pre-tension wire is currently providing to the blade connecting wire. If the tension in the pre-tension wires varies cyclically, this may be an indication of vibrations of the wind turbine blades within the rotor plane.

The step of deriving an estimate for blade vibrations and/or coupled rotor vibrations may comprise deriving an estimate for edgewise blade vibrations of the wind turbine blades. As described above, the edgewise blade vibrations are primarily arranged within the rotor plane, and thereby there is normally a large overlap between edgewise blade vibrations and blade vibrations within the rotor plane. Accordingly, edgewise blade vibrations provide a suitable measure for blade vibrations within the rotor plane. Furthermore, as described above, edgewise blade vibrations may be difficult to mitigate by means of known measures, such as pitch control, and therefore it is relevant to focus on these vibrations when applying the method according to the present invention.

The step of controlling the pre-tension mechanism may comprise individually adjusting the pre-tension provided by the respective pre-tension wires. According to this embodiment, the adjustment of the pre-tension provided by each pre-tension wire is adjusted independently of the adjustments of the pre-tension provided by each of the other pre-tension wires. Thereby the adjustments of the provided pre-tensions can be accurately designed to counteract the detected blade vibrations and/or coupled rotor vibrations, e.g. increasing the pre-tension applied in parts of the rotor where increased mutual support of the wind turbine blades is required and/or decreasing the pre-tension applied in parts of the rotor where decreased mutual support of the wind turbine blades is required.

As an alternative, the adjustable pre-tension mechanism may be controlled to adjust the pre-tension provided by the respective pre-tension wires in a substantially identical manner.

The step of deriving an estimate for blade vibrations and/or coupled rotor vibrations may comprise passing the measurements of the at least one parameter through a band pass filter.

According to this embodiment, only vibration frequencies which are relevant are taken into account when estimating the blade vibration and/or coupled rotor vibrations. For instance, only vibrations with frequencies close to resonance frequencies or eigenfrequencies of the wind turbine, the rotor and/or the wind turbine blades may be taken into account, and vibrations with frequencies outside such frequency regions may be filtered out. Thereby it is ensured that the subsequent control of the pre-tension adjustment mechanism is performed in a manner which counteracts blade vibrations and/or coupled rotor vibrations which are likely to have an adverse effect on the loads on the wind turbine, in particular on the rotor and the wind turbine blades.

The method may be performed during power production of the wind turbine. According to this embodiment, the method is performed during normal operation of the wind turbine, and thereby while the rotor is rotating and applying a torque to the generator, the rotor being subjected to the loads which naturally occur during power production.

Alternatively, the method may be performed during idling or standstill of the wind turbine. According to this embodiment, the method is performed while the rotor may rotate, but without applying a torque to the generator, and thereby without producing power, or while the rotor is not rotating. In this case the loads in general on the wind turbine are expected to be significantly lower than during normal operation of the wind turbine. However, during storms and extreme wind speed events, loads on the wind turbine can be high and blade vibrations can occur. Under such circumstances it may be relevant to perform the method according to the invention.

The step of controlling the pre-tension mechanism may comprise decreasing the pre-tension provided by at least one of the pre-tension wires.

When blade vibrations occur during standstill or idling, it may be relevant to decrease the pre-tension provided by at least some of the pre-tension wires, i.e. to relax at least some of the pre-tension wires, in order to counteract the vibrational motions. For instance, all pre-tension wires which are currently providing pre-tension to the blade connecting wires may be relaxed, e.g. completely removing the pre-tension. As an alternative, an appropriate offset may be added to the pre-tension provided by the pre-tension wires, the offset preferably decreasing the pre-tension provided by the pre-tension wires. This will change the blade vibration frequencies and their mutual couplings, thereby counteracting the blade vibrations. The change in pre-tension may be static, or the pre-tension may be varied on a time scale which is lower than the time it takes to build up the vibrations.

The method may further comprise the step of adjusting a pitch angle of the wind turbine blades based on the estimated vibrations in order to counteract the blade vibrations and/or coupled rotor vibrations. In this case the blade vibrations and/or coupled rotor vibrations are counteracted by a combination of adjusting the pitch angles of the wind turbine blades and adjusting the pre-tension provided by the pre-tension wires. Adjusting the pitch angles may provide a faster response to a detected blade or rotor vibration than adjusting the pre-tension provided by the pre-tension wires.

For instance, during situations with edgewise vibrations during idling of the wind turbine at high wind speeds, it may be optimal to pitch the blades from their stop position 10°-30° towards start position, i.e. from about 90° to 60°-80° in order to ensure a larger effect of the vibration counteracting provided by adjusting the pre-tension provide by the pre-tension wires. The pitching may be static or dynamic around a specific pitch angle.

BRIEF DESCRIPTION OF THE DRAWINGS

The invention will now be described in further detail with reference to the accompanying drawings in which.

DETAILED DESCRIPTION OF THE DRAWINGS

Figure 1:
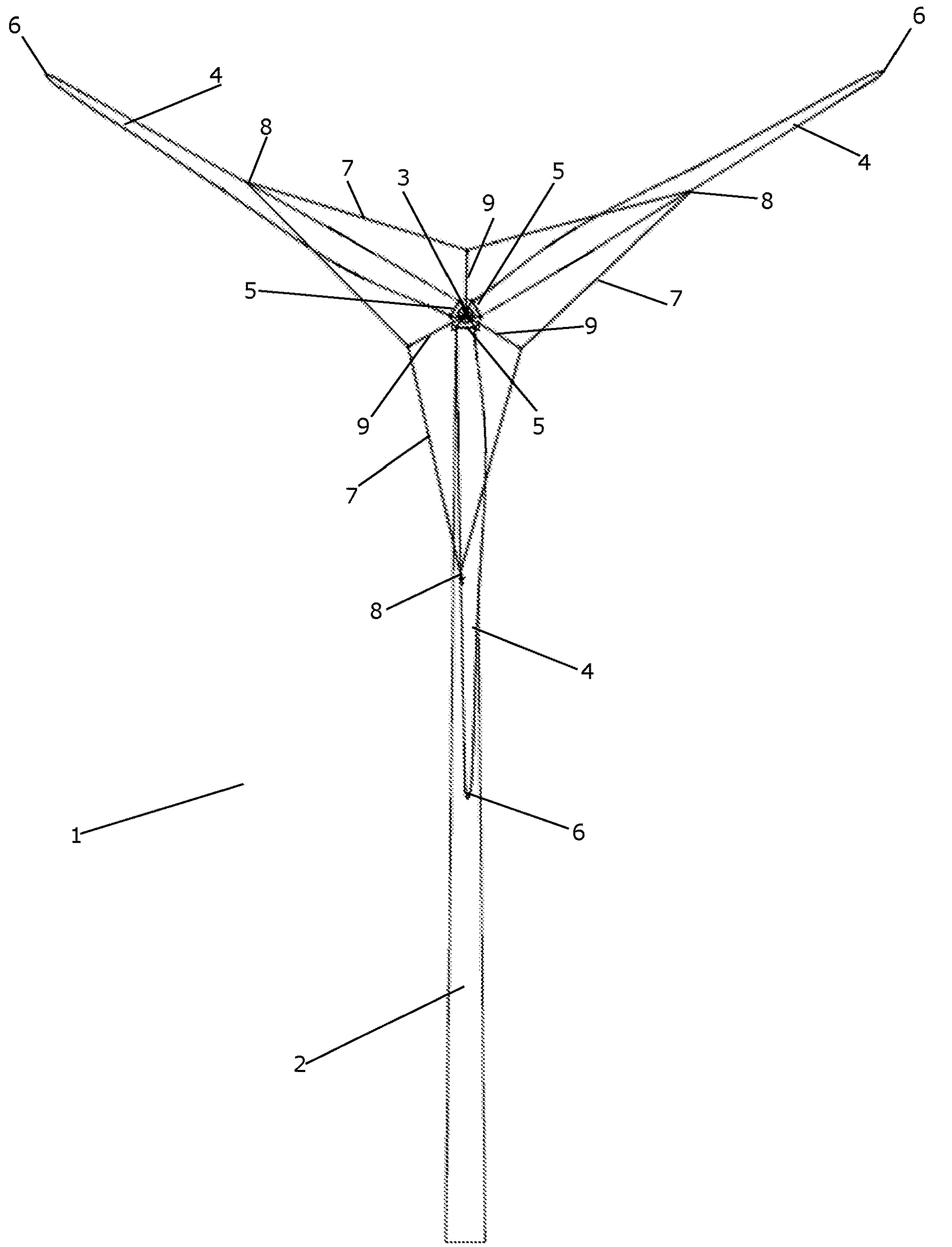
FIG. 1 is a front view of a wind turbine being controlled in accordance with a method according to an embodiment of the invention.

FIG. 1 is a front view of a wind turbine 1 being controlled in accordance with a method according to an embodiment of the invention. The wind turbine 1 comprises a tower 2 and a nacelle (not visible) mounted rotatably on the tower 2. A hub 3 carrying three wind turbine blades 4 is mounted rotatably on the nacelle. Accordingly, the wind turbine blades 4 rotate along with the hub 3, relative to the nacelle. The wind turbine blades 4 extend between a root end 5 connected to the hub 3 via a pitch mechanism, and a tip end 6 pointing away from the hub 3. The wind turbine blades 4 define a rotor plane.

The wind turbine 1 further comprises three blade connecting wires 7. Each of the blade connecting wires 7 extends between a connection point 8 on one wind turbine blade 4 and a connection point 8 on a neighbouring wind turbine blade 4. Thereby each wind turbine blade 4 is connected to its neighbouring wind turbine blades 4 by respective blade connecting wires 7. This allows the wind turbine blades 4 to mutually support each other, as described above.

The wind turbine 1 further comprises three pre-tension wires 9. Each pre-tension wire 9 is connected to one of the blade connecting wires 7 and to a pre-tension adjustment mechanism (not shown) arranged in the hub 3. Thereby each pre-tension wire 9 provides a pre-tension in the blade connecting wire 7 which it is connected to, and the provided pre-tension determines to which extent the wind turbine blades 4 being interconnected by the blade connecting wire 7 support each other. The provided pre-tension can be adjusted by means of the pre-tension adjustment mechanism, thereby adjusting the mutual support of the wind turbine blades 4.

The wind turbine 1 of FIG. 1 may be controlled in the following manner. Initially, at least one parameter of the wind turbine blades 4, e.g. edge root moments of each of the wind turbine blades 4, is measured. Next, an estimate for blade vibrations within the rotor plane for each of the wind turbine blades 4 and/or coupled rotor vibrations originating from the wind turbine blades 4 is derived from the at least one measured parameter. For instance, a frequency of the vibrations may be derived.

Finally, the pre-tension adjustment mechanism is controlled based on the estimated vibrations in order to counteract the blade vibrations and/or coupled rotor vibrations. This could, e.g., include adjusting the pre-tension provided by the pre-tension wires at a frequency which matches the frequency of the vibrations, and which is in antiphase therewith, thereby counteracting or cancelling out the detected vibrations.

Thereby any detected blade vibrations and/or coupled rotor vibrations are handled in an easy, accurate and cost effective manner, simply by appropriately controlling the pre-tension adjustment mechanism, and thereby adjusting the pre-tension provided to the blade connecting wires 7 by the pre-tension wires 9.

Figure 2:
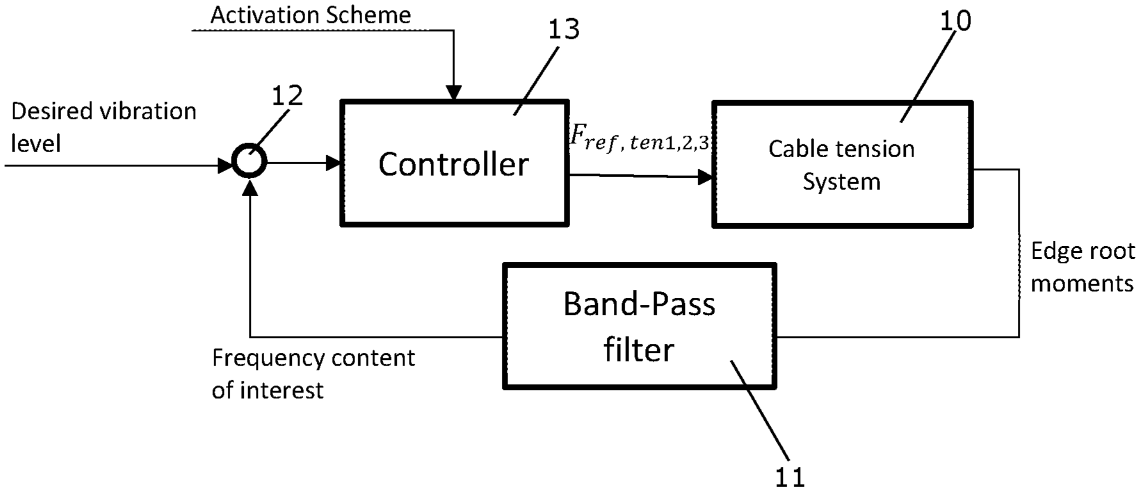
FIGS. 2 and 3 are block diagrams illustrating a method according to embodiments of the invention.

FIG. 2 is a block diagram illustrating a method according to an embodiment of the invention. The method illustrated in FIG. 2 may, e.g., be applied for controlling a wind turbine of the kind illustrated in FIG. 1.

A pre-tension adjustment mechanism 10 is controlled in order to provide pre-tension to blade connecting wires via pre-tension wires connected to the blade connecting wires and to the pre-tension adjustment mechanism 10, in the manner described above with reference to FIG. 1.

At least one parameter of the wind turbine blades, e.g. edge root moments of each of the wind turbine blades or tension in the pre-tension wires, is measured. The measured edge root moments are passed through a band-pass filter 11, and the part of the signal which contains vibrations within frequency ranges of interest is supplied to a comparator 12. The frequency ranges of interest may, e.g., include frequency ranges corresponding to resonance frequencies and/or eigenfrequencies of the wind turbine, notably related to the wind turbine blades and/or the rotor.

The comparator 12 also receives a signal indicating a desired vibration level, e.g. in the form of a threshold value for vibration amplitude, which should not be exceeded. The result of the comparison is supplied to a controller 13 which controls the pre-tension adjustment mechanism 10, in accordance with a selected activation scheme.

The controller 13 then causes the pre-tension adjustment mechanism 10 to adjust the pre-tension provided by each of the pre-tension wires in accordance with the comparison signal. This could, e.g., include adjusting the pre-tension provided by the pre-tension wires at a frequency which matches the frequency of the vibrations, and in antiphase therewith. Thereby the detected blade vibrations and/or coupled rotor vibrations are counteracted.

Figure 3:
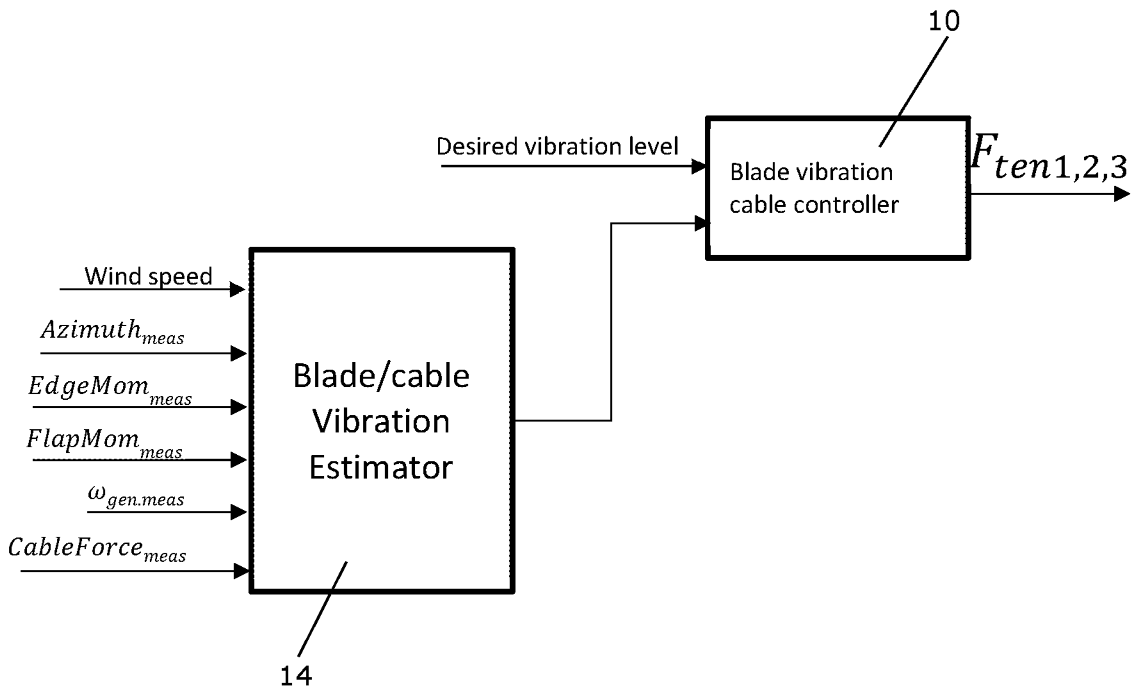

FIG. 3 is a block diagram illustrating a method according to an embodiment of the invention. The method illustrated in FIG. 3 may, e.g., be applied for controlling a wind turbine of the kind illustrated in FIG. 1.

A number of relevant measured parameters relating to the wind turbine blades, in the form of wind speed, azimuth position of the rotor, edge root moments of the wind turbine blades, flap moments of the wind turbine blades, generator torque and tension of the pre-tension wires, are supplied to a vibration estimator 14. Based thereon, the vibration estimator 14 derives an estimate for blade vibrations within the rotor plane and/or coupled rotor vibrations originating from the wind turbine blades. This may include deriving a frequency of the vibrations.

The estimated vibrations are supplied to a pre-tension adjustment mechanism 10, which is also provided with a desired vibration level, e.g. in the form of a threshold value for the vibration amplitude which should not be exceeded. Based thereon, the pre-tension adjustment mechanism 10 adjusts the pre-tension provided by the pre-tension wires in order to counteract the detected blade vibrations and/or coupled rotor vibrations. This could, e.g., include varying the pre-tension provided by the pre-tension wires cyclically, at a frequency which matches the frequency of the vibrations, and in antiphase therewith, as described above.

Figure 4:
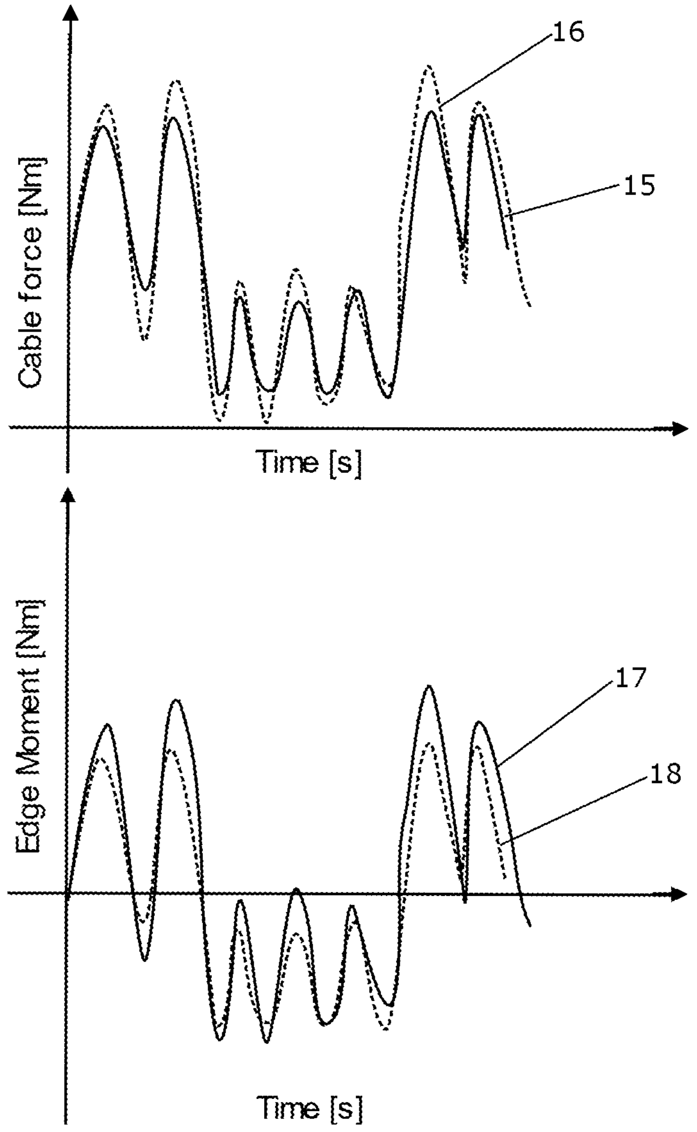
FIG. 4 shows two graphs illustrating counteracting of edgewise vibrations of wind turbine blades by performing a method according to an embodiment of the invention during normal operation of the wind turbine.

FIG. 4 shows two graphs illustrating counteracting of edgewise vibrations of wind turbine blades due to performing a method according to an embodiment of the invention during normal operation of the wind turbine. The upper graph shows a pulling force, i.e. pre-tension, provided by the pre-tension wires to the blade connecting wires as a function of time, and the lower graph shows edge moment of the wind turbine blades as a function of time, and corresponding to the applied pre-tension shown in the upper graph.

In the upper graph, the solid line 15 represents applied pre-tension without performing the method according to the invention, and the dashed line 16 represents applied pre-tension as adjusted as a result of performing the method according to the invention. It can be seen that the adjusted pre-tension 16 differs slightly from the non-adjusted pre-tension 15, in particular at or near local minima and maxima of the curves 15, 16.

In the lower graph, the solid line 17 represents edge moment of the wind turbine blades when the method according to the invention is not performed, i.e. when the applied pre-tension follows the solid line 15 of the upper graph. The dashed line 18 represents edge moment of the wind turbine blades when the method according to the invention is performed, i.e. when the applied pre-tension is adjusted in accordance with the dashed line 16 of the upper graph.

It can be seen that adjusting the applied pre-tension in accordance with a method according to the invention results in reduced edge moments, and thereby a reduction in edgewise vibrations of the wind turbine blades. In particular, the peak edge moments are reduced.

Figure 5:
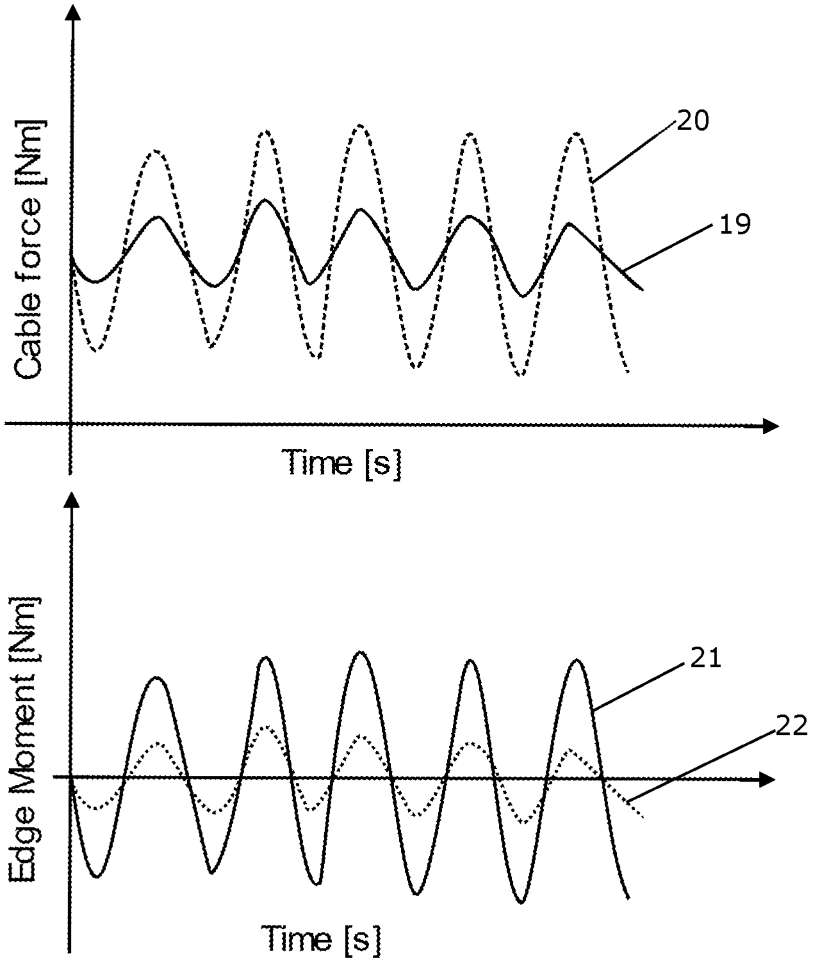
FIG. 5 shows two graphs illustrating counteracting of edgewise vibrations of wind turbine blades by performing a method according to an embodiment of the invention during standstill.

FIG. 5 shows two graphs illustrating counteracting of edgewise vibrations of wind turbine blades due to performing a method according to an embodiment of the invention during standstill of the wind turbine. The upper graph shows a pulling force, i.e. pre-tension, provided by the pre-tension wires to the blade connecting wires as a function of time, and the lower graph shows edge moment of the wind turbine blades as a function of time, and corresponding to the applied pre-tension shown in the upper graph.

In the upper graph, the solid line 19 represents applied pre-tension without performing the method according to the invention, and the dashed line 20 represents applied pre-tension as adjusted as a result of performing the method according to the invention. It can be seen that the adjusted pre-tension 20 varies significantly more than the non-adjusted pre-tension 19, in particular resulting in higher maxima and lower minima.

In the lower graph, the solid line 21 represents edge moment of the wind turbine blades when the method according to the invention is not performed, i.e. when the applied pre-tension follows the solid line 19 of the upper graph. The dashed line 22 represents edge moment of the wind turbine blades when the method according to the invention is performed, i.e. when the applied pre-tension is adjusted in accordance with the dashed line 20 of the upper graph.

It can be seen that adjusting the applied pre-tension in accordance with a method according to the invention results in significantly reduced variations in the edge moment of the wind turbine blades, and thereby a significant reduction in edgewise vibrations of the wind turbine blades.

The invention claimed is:

1. A method for controlling a wind turbine, the wind turbine comprising a tower, a nacelle mounted on the tower, a hub mounted rotatably on the nacelle, and three or more wind turbine blades, each wind turbine blade extending between a root end connected to the hub via a pitch mechanism, and a tip end, the wind turbine blades defining a rotor plane, the wind turbine further comprising blade connecting wires, each blade connecting wire extending between a connection point on one wind turbine blade and a connection point on a neighbouring wind turbine blade, and pre-tension wires, each pre-tension wire being connected to one of the blade connecting wires and to a pre-tension adjustment mechanism, the method comprising:

measuring at least one parameter of the wind turbine blades of the wind turbine, deriving, from the at least one measured parameter, an estimate for blade vibrations within the rotor plane of each wind turbine blade and/or coupled rotor vibrations originating from the wind turbine blades, and controlling the pre-tension adjustment mechanism based on the estimated vibrations in order to counteract the blade vibrations and/or coupled rotor vibrations.

2. A method according to claim 1, wherein deriving the estimate for blade vibrations and/or coupled rotor vibrations comprises deriving a frequency of the vibrations, and wherein controlling the pre-tension adjustment mechanism comprises adjusting the pre-tension provided by the pre-tension wires at a frequency which matches the frequency of the vibrations.

3. A method according to claim 1, wherein measuring at least one parameter of the wind turbine blades of the wind turbine comprises measuring an edge moment of each wind turbine blade.

4. A method according to claim 1, wherein measuring at least one parameter of the wind turbine blades of the wind turbine comprises measuring a tension of each of the pre-tension wires.

5. A method according to claim 1, wherein deriving the estimate for blade vibrations and/or coupled rotor vibrations comprises deriving an estimate for edgewise blade vibrations of the wind turbine blades.

6. A method according to claim 1, wherein controlling the pre-tension mechanism comprises individually adjusting the pre-tension provided by the respective pre-tension wires.

7. A method according to claim 1, wherein deriving the estimate for blade vibrations and/or coupled rotor vibrations comprises passing the measurements of the at least one parameter through a band pass filter.

8. A method according to claim 1, wherein the method is performed during power production of the wind turbine.

9. A method according to claim 1, wherein the method is performed during idling or standstill of the wind turbine.

10. A method according to claim 1, wherein controlling the pre-tension mechanism comprises decreasing the pre-tension provided by at least one of the pre-tension wires.

11. A method according to claim 1, further comprising adjusting a pitch angle of the wind turbine blades based on the estimated vibrations in order to counteract the blade vibrations and/or coupled rotor vibrations.

12. A wind turbine, comprising:

a tower;

a nacelle mounted on the tower;

a hub mounted rotatably on the nacelle; and three or more wind turbine blades, each wind turbine blade extending between a root end connected to the hub via a pitch mechanism, and a tip end, the wind turbine blades defining a rotor plane;

blade connecting wires, each blade connecting wire extending between a connection point on one wind turbine blade and a connection point on a neighbouring wind turbine blade;

pre-tension wires, each pre-tension wire being connected to one of the blade connecting wires and to a pre-tension adjustment mechanism; and a controller configured to perform an operation, comprising:

measuring at least one parameter of the wind turbine blades;

deriving, from the at least one measured parameter, an estimate for blade vibrations within the rotor plane of each wind turbine blade and/or coupled rotor vibrations originating from the wind turbine blades; and controlling the pre-tension adjustment mechanism based on the estimated vibrations in order to counteract the blade vibrations and/or coupled rotor vibrations.

13. A wind turbine, according to claim 12, wherein deriving the estimate for blade vibrations and/or coupled rotor vibrations comprises deriving a frequency of the vibrations, and wherein controlling the pre-tension adjustment mechanism comprises adjusting the pre-tension provided by the pre-tension wires at a frequency which matches the frequency of the vibrations.

14. A wind turbine, according to claim 12, wherein measuring at least one parameter of the wind turbine blades of the wind turbine comprises measuring an edge moment of each wind turbine blade.

15. A wind turbine, according to claim 12, wherein measuring at least one parameter of the wind turbine blades of the wind turbine comprises measuring a tension of each of the pre-tension wires.

* * * * *